Figure 1:
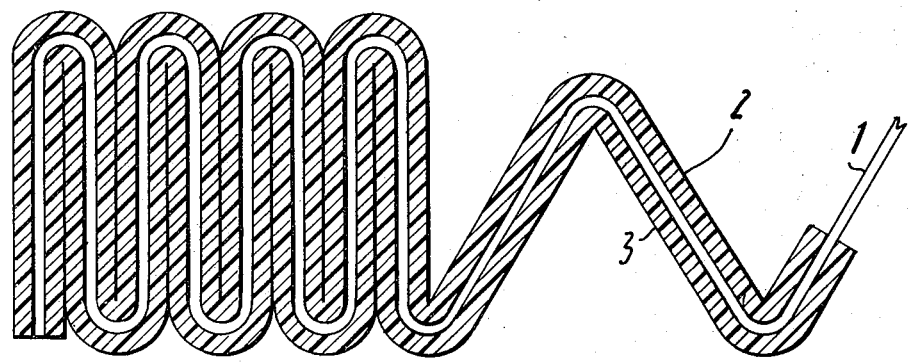

United States Patent
Neumann

[11] 3,871,851
[45] Mar. 18, 1975

[54] FILTER PACK
[75] Inventor: Gerhard Max Neumann, Berlin, Germany
[73] Assignee: Delbag Luftfiler GmbH, Berlin, Germany
[22] Filed: July 27, 1972
[21] Appl. No.: 275,700

[52] U.S. Cl................ 55/521, 55/500, 55/524, 210/493
[51] Int. Cl................................ B01d 27/06
[58] Field of Search .............. 55/497–500, 55/521, 524; 210/493

[56] References Cited
UNITED STATES PATENTS
| | | | |
|---|---|---|---|
| 3,025,963 | 3/1962 | Bauer | 210/493 |
| 3,165,473 | 1/1965 | Pall et al. | 210/493 |
| 3,397,518 | 8/1968 | Rogers | 55/497 |
| 3,465,413 | 9/1969 | Rosaen et al. | 55/521 |
| 3,631,582 | 1/1972 | Lucas et al. | 55/521 |
| 3,692,184 | 9/1972 | Miller et al. | 55/498 |

FOREIGN PATENTS OR APPLICATIONS
1,206,351  8/1959  France................ 240/493

Primary Examiner—Bernard Nozick
Attorney, Agent, or Firm—Watson, Cole, Grindle & Watson

[57] ABSTRACT

A high grade particular filter pack having sizable effective filtering surfaces on a relatively small base for purification of gas produced by forming the filter surface as a zig-zag shaped web, continuous spacer strips or ridges formed for example of a platics material, being stuck onto the web, the material of the spacer strips or ridges being cured so that the filter pack assumes a good rigidity.

13 Claims, 2 Drawing Figures

FILTER PACK

The invention relates to a high-grade particle filter packs having sizeable effective filtering surfaces on relatively small base areas, for purification of a gas, which are produced by folding large-area webs of filter paper in zig-zag shape. It is necessary to incorporate spacers to maintain the narrow gaps, in order to prevent the lateral surfaces of the individual folds of the filter paper from coming into direct contact with each other. Only a high quality filter paper as consists of fibres of minimal size and contains no more than a small prescribed proportion of binder, can be employed for high-grade particle filter packs which must totally remove all particles suspended in the flow of air or gas; a filter paper of this kind is very soft and thus highly sensitive to mechanical strains, so that the affixing of the spacers implies the risk of damaging the filter paper, the prevention thereof representing a special problem.

In a known form of embodiment of the filter packs, depressions or embossments having the nature of corrugations or flutes forming projections are produced for example during or after the production of the filter paper, which are placed in contact with each other upon folding the paper webs in zig-zag shape and are intended to establish an uniform spacing between the folds in this manner. Its essential disadvantage however consists in that the production of these depressions or embossments already entails the risk that the weak filter paper may already be damaged in such degree as to be unusalbe, during the incorporation of these spacing surfaces. A filter pack of this nature failed to gain acceptance for this reason, especially for soft high-grade filter papers. The method then adopted consisted in employing spacers consisting of strips or cords of a variety of materials, such as rubber, yarn, asbestos, paper or cardboard, affixed on one or both sides of the filter paper, for example by gluing. These strips or cords should consist of yielding and pliable material to prevent damaging the weak filter paper during the folding and handling of the filter pack. Moreover, to prevent the spacers damaging the filter paper as far as possible, it is initially necessary to pre-fold the filter paper without spacers, and then to stretch the same out again to join the spacers to the filter paper at one or both sides by gluing, whereupon the folded condition is established again. The spacers are concomitantly placed in mutual contact, thus producing a multiplicity of folds which are open at one end side and whereof the lateral surfaces extend parallel to each other. During the re-folding operation, the strips or cords however frequently tear holes in the paper, especially at the folded edges, because the radii of curvature at the folding points are commonly smaller than the diameters of the spacers. Accordingly, the rate or wastage is perforce very high in the case of this known filter pack.

A filter pack is known moreover, wherein ridge shaped and ball or strip-like projections formed of an adhesive material are affixed on one or both sides of the pre-folded and re-stretched paper web in the direction of folding as well as at right angles thereto and with spacings between them, so that upon re-establishing the folded condition, the ridges of the two sides of the paper are placed in contact with each other and act as spacers. Folds having lateral surfaces parallel to each other are also produced thereby. Since the ridges do not extend throughout the depth of the folds, the filter pack cannot form an intrinsically stable element, so that the folds are squashed and lose their positioning, particularly by the action of dampness and of a high rate of air throughflow.

The pre-folding and re-stretching of the paper web is omitted in the case of another known form of embodiment. An adhesive substance is sprayed from above into the folded and partially opened paper web, reaching at most as far as half the depth of the folds and acting as a spacer after hardening. This known filter pack is disadvantageous inasmuch as the adhesive composition sprayed in cannot follow a controlled course without forming an unitary filament, and sine a precise folded folded having precisely specified fold spacings cannot be produced thereby. Filter packs having a greater fold depth, for example exceeding 40 mms, cannot be produced in this manner for the aforesaid reasons. Moreover, the creases are not adequately enflanked. If the adhesive composition is to be inserted from both sides, it is necessary to allow the adhesive introduced at one side to set first, then to turn over the folded web, so that the adhesive may also be introduced at the other side. As already stated, this method results in irregular spacings and folds and in the bulging and clumping of the adhesive, and is very complex moreover; beyond this, it does not endow the filter pack with any adequate stability and strength throughout the area of the paper, such as required in the case of the very soft and sensitive high-grade papers. Stiffer papers only, for example so-called composite papers, having a high binder content but no longer complying with the demands made on a particle filter, can be employed in this method, for this reason.

Finally, another method is also known, wherein the lateral sides of the individual folds extend at very acute angles to each other by being folded on a bladed mechanism, to obtain a maximum filtering area; in this case, the folds to not form lateral surfaces extending parallel to each other. Thread-like continuous prominences consisting of adhesive were affixed at right angles to the direction of folding and at small distances from each other, on the pre-folded and re-stretched paper web, to secure the folds. The paper web is then re-folded by being pushed together to obtain the gap width required between the folds, the strings or threads not being placed in contact with each other. Apart from the fact that folds of uniform gap width cannot be obtained thereby without employing a folding gauge, the continuous thread-like prominences do not represent functionally effective spacers; the folds are in fact held merely by the adhesive present at the crease of the folds. Accordingly, they are sensitive to compressive stresses at right angles to the crease, since the thin hardened adhesive threads break immediately in the creases or else cause damage to the filter paper by being pushed through the same, even in the case of elastic threads. For this reason, a filter pack of this nature may be produced in practice with a very high proportion of scrap only. The fold depth is small in all known filter packs; it cannot exceed 40 mms in any event.

All the known filter packs comprising filter papers folded in zig-zag shape and having the aforesaid spacers, incur another decisive disadvantage, inasmuch as the filter packs, i.e. the paper folded in zig-zag shape and the spacers, do not represent any intrinsically adequate solid and cohesive statically loadable structure which can withstand the mandatorily incurred mechanical stresses during production and subsequent filtering operation, especially in case of damp air. For the foregoing reasons, all the known filter packs may be produced with a small depth of fold of up to approximately 40 mms only, the application of harder filter papers, being papers with greater staple fibre lengths and greater proportions of binder, being required as a rule. It is impossible however to produce greater depth of fold with the known spacers from high-grade soft filter papers, such as "glass paper" or "synthetic paper." The low stability and strength of the filter packs immediately results in displacements of the folds and to local constrictions in the folds, so that the prescribed bursting pressure cannot be maintained, in the case of greater airflow loading and especially at a high degree of atmospheric humidity. The humidity which is stored up in the pores of the paper causes the thin high-grade filter paper having fibres of minimum size and a small proportion of binder, to become extremely soft and weak, so that it cannot withstand the action of pressure. Moreover, the production of the known filter packs from such papers must be performed very circumspectly and is onerous and costly, since appropriate lengths corresponding from the beginning to the filter pack size required in each case must first be cut off from the filter paper web available in the form of rolls, whereupon the web sections cut off must be folded separately into filter packs, together with the spacers applied thereon. It has been imposible until now to perform a practically endless continuous production of a zig-zag shaped filter pack web which may be severed into individual filter packs of different size after the folding operation by severing by means of cutting tapes or the like, because of the low mechanical strength of the filter pack and because of the absence of an indissoluble joint between the paper and spacers.

The object of the invention is the provision of a compact zig-zag shaped filter pack web which forms a block of soft filter paper and rigid plastic spacing material of intrinsically adequate strength and rigidity, which withstands all mechanical stresses incurred and may be severed by means of conventional cutting tools such as saws or cutting bands, like a board, without concomitant displacement of the paper, so that an endless and continuously produced zig-zag shaped filter pack web may be cut in the direction of folding and if appropriate also at right angles to the direction of folding in the middle of a spacer, to produce individual packs of ever constant strength having the size required, with a folding depth of optional magnitude of up to 100 mms. Whilst offering precisely delimited fold interstices which are maintained without alteration or deformation even in case of rippling motion, at high atmospheric humidity or powerful air pressure loading.

Accordingly the invention consists in a filter pack for purification of air or gas, comprising filter paper folded in zig-zag shape, continuous ridges of adhesive material whereof the height is equal to half the gap between folds and intended to secure the folds and to maintain the spacings fixed to both sides of the paper, wherein the ridges have an approximately rectangular cross-section and are formed from a material hardening under rapid fusion with itself within the paper folds by the action of heat, irradiation or polymerisation, and wherein the ridges enblank the filter paper on the outer sides of the creases and immovably and rigidly interconnect the folds throughout their depth.

In the case of the inventive filter pack, the paper web is initially pre-folded in zig-zag shape with convex and concave creases in accordance with conventional practice, is then stretched again, whereupon strips of pasty material of rectangular cross-section and acting as spacers are applied under appropriate pressure by means of nozzles, being applied simultaneously and in precise mutual alignment throughout the length of both sides of the paper. The ambilateral application of the pasty material under pressure ensures that the same also comes into form contact with the surface of the filter paper even in the creases. After repeated folding of the paper web into the initial zig-zag shape, the rectangular strips come into contact with each other whilst in their pasty condition, whereupon the individual strips are fused or "frozen" in the folds of the paper by infrared or ultraviolet irradiation or by accelerated polymerisation. The individual strips are then joined together along their contact surfaces within the folds to form a single uninterruped, cohesive and rigid spacing strip of rectangular cross-section. The folds of the paper can no longer be opened after this process, thus producing a strong and rigid filter pack wherein an absolutely uniform fold structure is produced, with parallel paper surfaces within the folds. Since the folded paper web is immovably clamped on both sides and throughout its depth between the hard spacing strips joined together by cold or hot welding, this results in an endless, continuously producible, compact and zig-zag shaped folded filtering block of optional length, which is secured against any buckling caused by atmospheric humidity and powerful air pressure loading and against any mechanical damage, wherein the folds may have an optional depth of up to approximately 100 mms, and which may be separated by cutting into individual filter packs of the size required, without damage and wastage. Upon laying the filter pack on a rough surface, damage to the paper itself is precluded since the surface merely comes into contact with the spacing strips which are so hard however, that they endow the filter pack with a rigidity corresponding approximately to an inserted metal wire.

In its broader aspects, the present invention provides a filter pack which comprises an elongated sheet of filter paper folded in a zig-zag shape along transversely extending folds to present a continuous filter structure having a series of lengths interconnected by a corresponding series of generally U-shaped bight sections. The lengths are disposed in spaced, generally parallel relationship to present, along with said bight sections, a series of outwardly opening spaces between the lengths with alternate spaces opening outwardly of the structure from opposite sides thereof. The filter pack of the present invention also includes a plurality of elements constructed of a hardened, initially adhesive material interconnecting the lengths of the paper and rigidifying the shape of the structure. Each of the elements extends longitudinally of the folded sheet of paper and each includes a series of generally parallel, spaced, rigid, projecting portions, each portion being shaped to substantially completely fill the cross sectional area of one of the spaces. A first sequence of the elements is disposed in laterally spaced relationship on one side of the structure and each element of such first sequence thereof has a respective portion projecting into each of the spaces which open outwardly of said one side of the structure. A second sequence of the elements is disposed in laterally spaced relationship on the other side of the structure and each element of the second sequence thereof has a respective portion projecting into each of the spaces which open outwardly of said other side of the structure. Each of the portions is rigidly connected to each of the lengths of filter paper which define the corresponding space in which that portion is disposed whereby the lengths of filter paper are interconnected and the shape of the structure is rigidified.

More particularly, in the filter pack of the present invention, the bight sections of the folded sheet of filter paper each have internal and external curved surfaces and each of the elements includes a series of segments having surfaces mated and rigidly attached to the external surfaces of corresponding bight sections. Adjacent projecting portions of each element are integral with and are interconnected by one of such segments and the free end of each projecting portion is rigidly connected to the internal curved surface of the corresponding bight section.

The rigides may consist of water glass with a quartz powder filler.

The ridges alternatively may consist of a polyester paste hardening under ultraviolet radiation.

The ridges may also consist of polyurethane foam having a short pot life such as to ensure to erect formation of the ridges.

The ridges optionally may consist of polyvinyl acetate comprising a filler in aqueous synthetic resin dispersion, having a viscosity of < 40,000 cp or a thixotropic texture.

The height of the folds may amount to between 45 and 50 mms and that the gap established between the folds by the filar ridges amounts to between 1.5 to 2.0 mms.

Another optional feature is that the height of the folds amounts to between 80 and 90 mms and that the fold spacing established by the ridges amounts to between 2.5 and 3.0 mms.

The mutual spacing between the ridges may amount to between 20 and 25 mms, irrespective of fold height.

Yet another optional feature is that the ridges situated at the ambilateral external edges of the filter packs have approximately five times the width of the inner ridges, the width of the inner ridges amounting to between 1.8 and 2.5 mms.

The external ridges of the filter pack may be formed as sealing edges, and that the two external longitudinal folds have a sealing covering of the material of the ridges whereof the width and thickness are equal to those of the external edges.

Finally, the filter back be equipped with a framing or mounting of hard polyurethane foam, into which rubber seals are foamed.

Thanks to the fact that wider spacing strips are situated at the longitudinal edges and that a sealing covering of identical width and thickness and consisting of the same material is situated at the transverse edges of the filter pack, the filter pack according to the invention may be employed without a complementary sealing frame. An economical and continuous production is possible in the case of the filter pack according to the invention.

Figure 2:
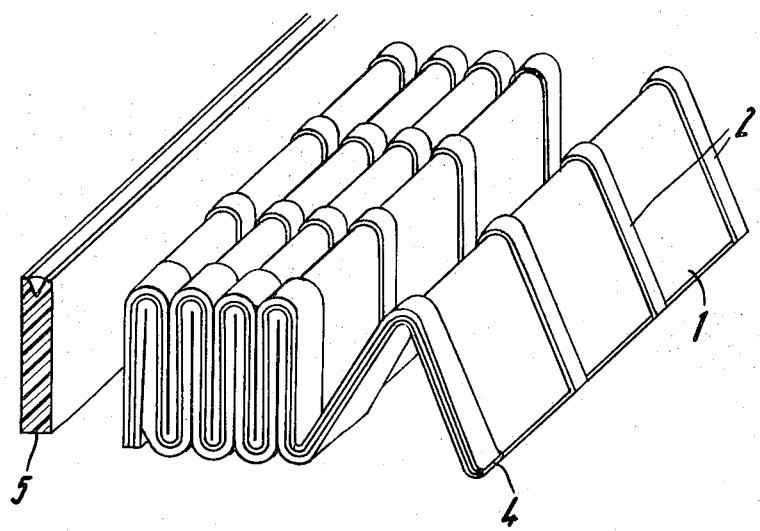

The accompanying drawings show a form of embodiment of the filter pack according to the invention, given by way of example, and FIG. 1 is a cross-sectional elevational view of a filter pack of the present invention during the folding operation; and FIG. 2 is a perspective view corresponding with FIG. 1.

As apparent from the figures, continuous rectangular cords or ridges 2,3 whereof the height corresponds to half the width of opening of the fold, are applied in precise mutual alignment on both sides of a pre-folded and re-stretched paper web 1. After the refolding operation, the end faces of the ridges 2,3 are placed in mutual contact, in which they are rapidly fused or "frozen" into rigid spacers by irradiation or polymerisation. The ridges 4 situated on the longitudinally directed outer edges have a greater width, so that they may act as sealing elements. Sealing elements 5 of the same material are secured to the same manner on the transverse sides of the filter packs, thereby eliminating the application of a complementary sealing frame receiving the filter pack.

By the term ridges is meant raised portions, strips or even cordlike or threadlike formations acting as spacers.

What we claim is:

1. A filter pack comprising:

an elongated sheet of filter paper folded in a zigzag shape along transversely extending folds to present a continuous filter structure having a series of lengths interconnected by a corresponding series of generally U-shaped bight sections, said lengths being disposed in space, generally parallel relationship to present, along with said bight sections, a series of outwardly opening spaces between the lengths with alternate spaces opening outwardly of the structure from opposite sides thereof; and a plurality of elements constructed of a hardened, initially adhesive material interconnecting the lengths of the paper and rigidifying the shape of the structure, each of said elements extending longitudinally of the folded sheet of paper and each including a series of generally parallel, spaced, rigid, projecting portions, each portion being shaped to substantially completely fill the cross-sectional area of one of the spaces, there being a first sequence of said elements disposed in laterally spaced relationship on one side of the structure, each element of said first sequence thereof having a respective portion projecting into each of the spaces which open outwardly of said one side of the structure, there being a second sequence of said elements disposed in laterally spaced relationship on the other side of the structure, each element of said second sequence thereof having a respective portion projecting into each of the spaces which open outwardly of said other side of the structure, each of said portions being rigidly connected to each of the lengths of filter paper which define the corresonding space in which that portion is disposed whereby said lengths are interconnected and the shape of the structure is rigidified.

2. A filter pack as set forth in claim 1 wherein the elements are of water glass with a quartz powder filler.

3. A filter pack as set forth in claim 1 wherein the elements are of a polyester paste hardened by ultraviolet radiation.

4. A filter pack as set forth in claim 1 wherein the elements are of polyurethane foam originally having a short "tub" period.

5. A filter pack as set forth in claim 1 wherein said lengths are between 45 and 50 mms long and are disposed between 1.5 and 2.0 mms apart.

6. A filter pack as set forth in claim 1 wherein said lengths are between 80 and 90 mms long and are disposed between 2.5 and 3.0 mms apart.

7. A filter pack as set forth in claim 1 wherein the elements of each sequence are spaced laterally between 20 and 25 mms apart.

8. A filter pack as set forth in claim 1 wherein said bight sections of the folded sheet of filter paper each have internal and external curved surfaces and each of said elements includes a series of segments having surfaces mated and rigidly attached to the external surfaces of corresponding bight sections, adjacent projection portions of each element being integral with and interconnected by one of the segments, the free end of each projecting portion being rigidly connected to the internal curved surface of the corresponding bight section.

9. A filter pack as set forth in claim 1, wherein said first and second sequences of elements each includes an element disposed at each lateral edge of the sheet of filter paper, the elements of each sequence at the same lateral edge being rigidly attached to one another to present a seal for that edge.

10. A filter pack as set forth in claim 1 wherein each sequence of elements includes an element disposed at each lateral edge of said folded sheet of filter paper and at least one centrally disposed element, said elements at said lateral edges having a lateral width approximately five times the lateral width of a centrally disposed element of the sequence.

11. A filter pack as set forth in claim 10 wherein each centrally disposed element has a lateral width of between 1.8 and 2.5 mms.

12. A filter pack as set forth in claim 1 wherein the elements are of filled polyvinyl acetate.

13. A filter pack as set forth in claim 12 wherein the elements are filled with a filler and a synthetic resin dispersion with a viscosity of less than 40,000 cp.

* * * * *